Oct. 19, 1926.

F. L. SIMMONS 1,603,497

MAGNETIC CHUCK WITH FINE MESH FACEPLATE

Filed June 25, 1924    5 Sheets-Sheet 1

Frank L. Simmons
INVENTOR

BY George Ramsey
ATTORNEY

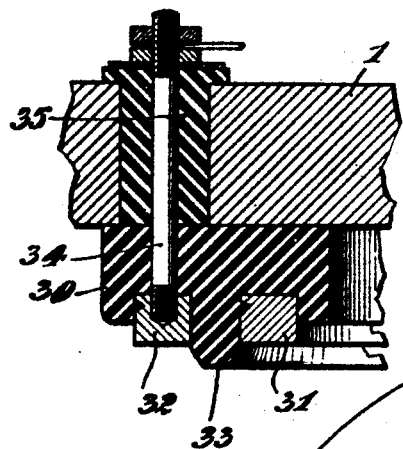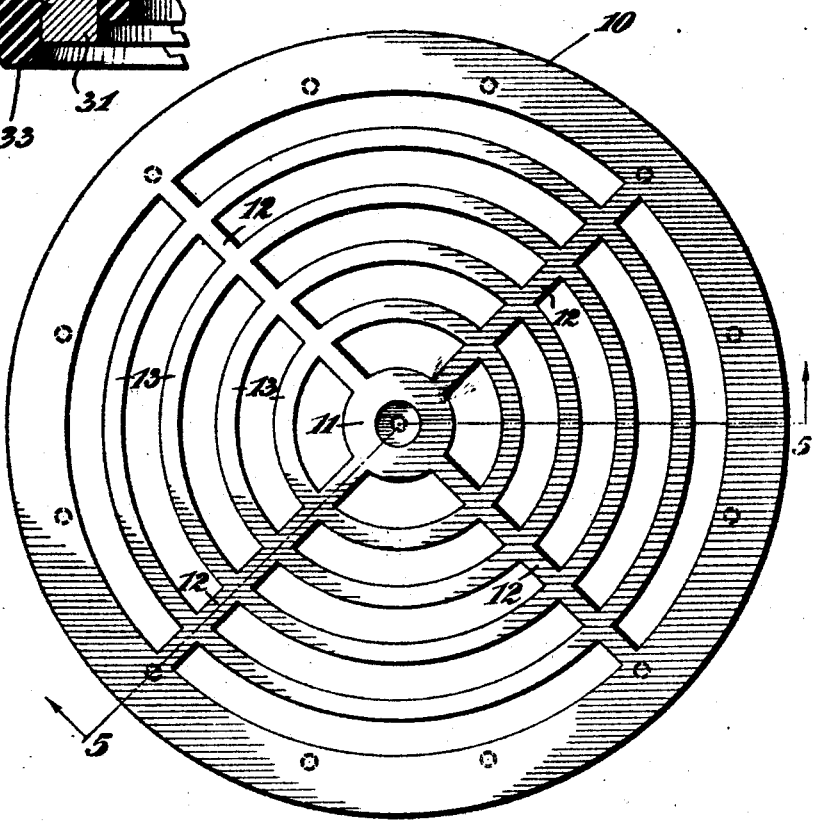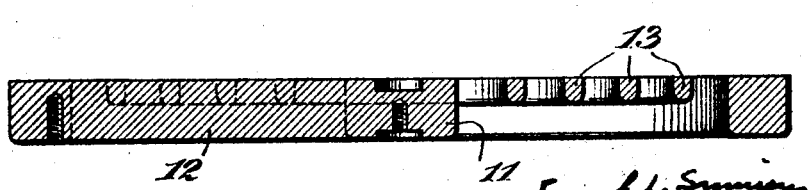

Oct. 19, 1926.  
F. L. SIMMONS  
1,603,497  
MAGNETIC CHUCK WITH FINE MESH FACEPLATE  
Filed June 25, 1924   5 Sheets-Sheet 3
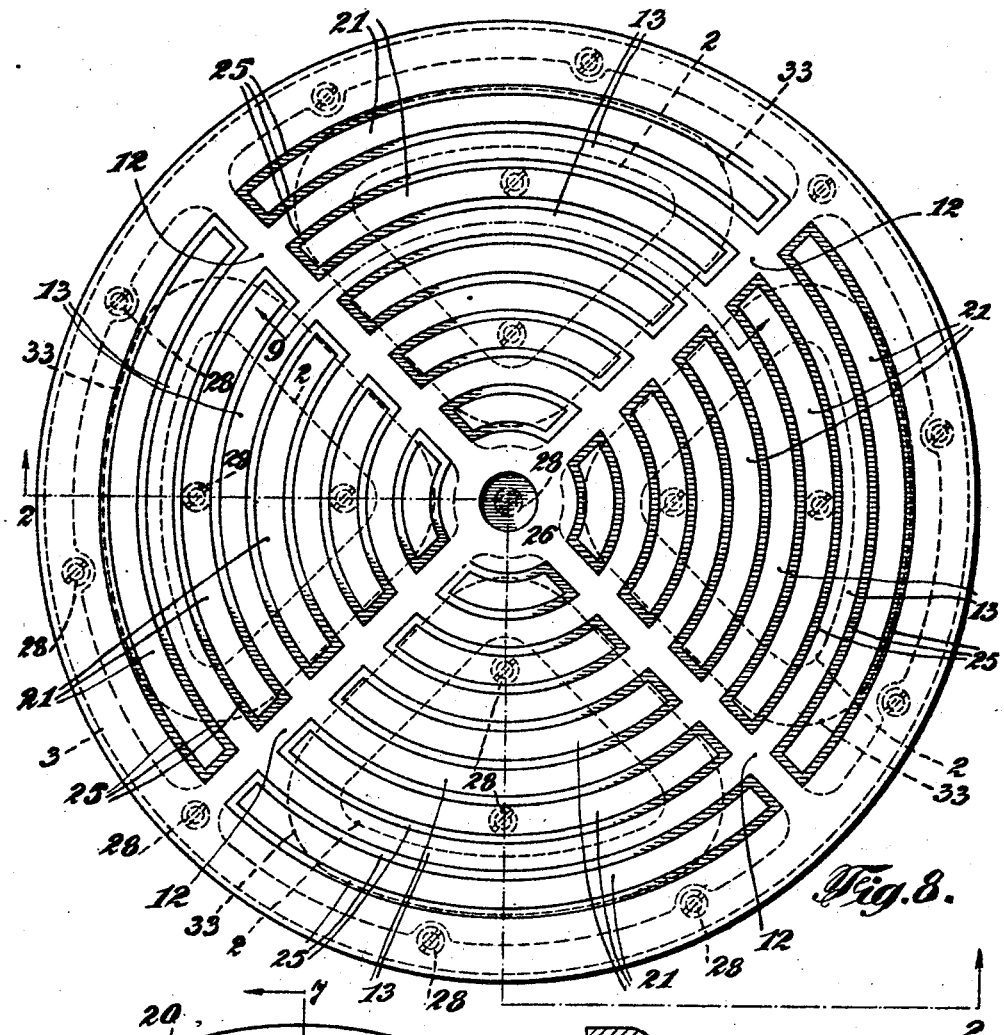
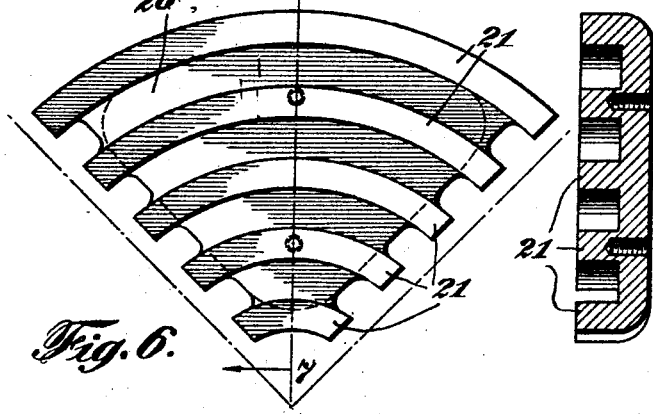
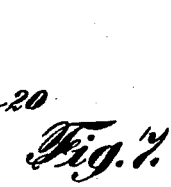

Oct. 19, 1926.
F. L. SIMMONS
MAGNETIC CHUCK WITH FINE MESH FACEPLATE
Filed June 25, 1924      5 Sheets-Sheet 4
1,603,497
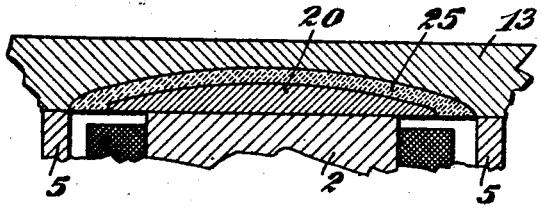
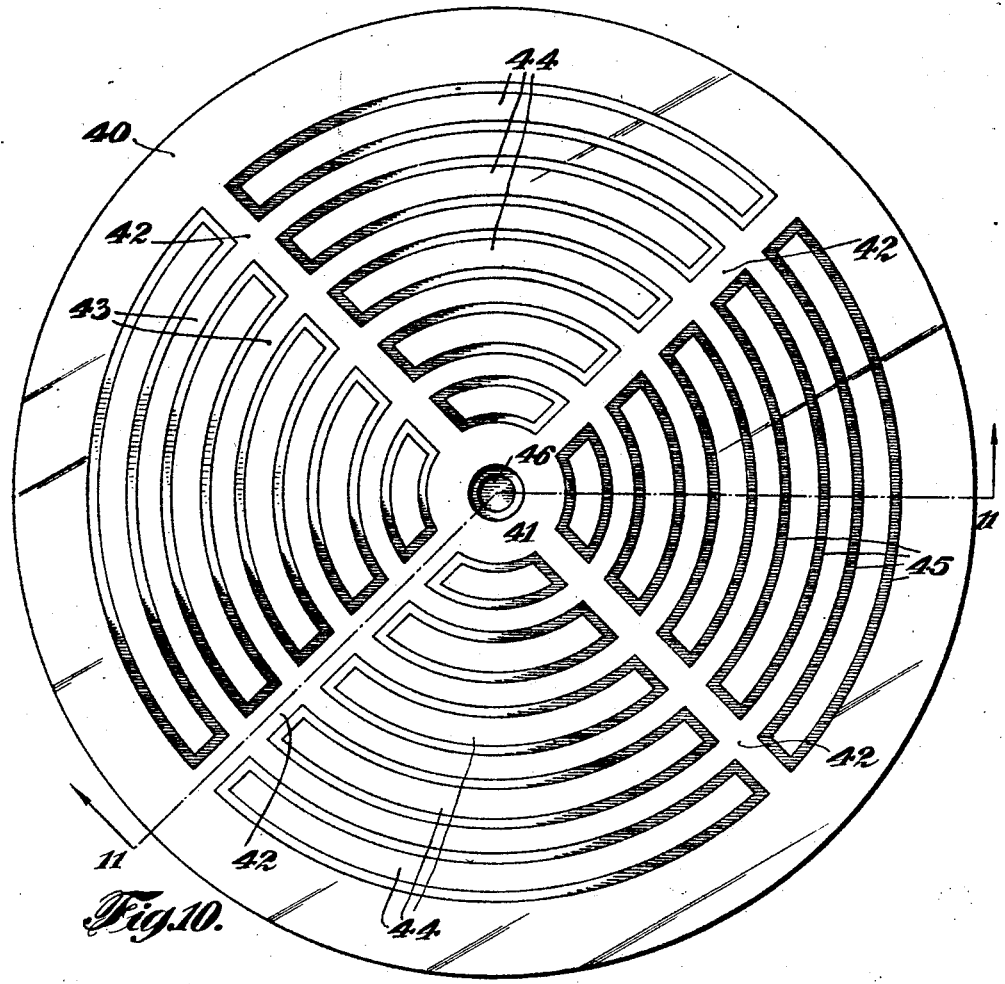
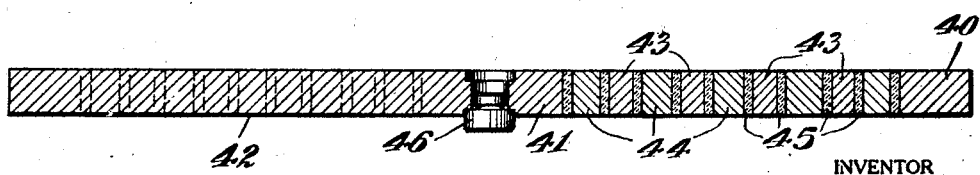
INVENTOR
Frank L. Simmons
BY
George Ramsey
ATTORNEY Oct. 19, 1926.

F. L. SIMMONS 1,603,497

MAGNETIC CHUCK WITH FINE MESH FACEPLATE

Filed June 25, 1924    5 Sheets-Sheet 5

Frank L. Simmons
INVENTOR

George Ramsey
BY
ATTORNEY

Patented Oct. 19, 1926.

1,603,497

UNITED STATES PATENT OFFICE.

FRANK LEROY SIMMONS, OF WOONSOCKET, RHODE ISLAND, ASSIGNOR TO THE TAFT-PIERCE MANUFACTURING COMPANY, OF WOONSOCKET, RHODE ISLAND, A CORPORATION OF RHODE ISLAND.

MAGNETIC CHUCK WITH FINE-MESH FACEPLATE.

Application filed June 25, 1924. Serial No. 722,213.

This invention relates broadly to electrical apparatus and particularly to magnetic chucks.

The principal and general object of the invention is to provide a magnetic chuck capable of securely holding a large number of small pieces to be operated upon.

Another object of the invention is to provide a magnetic chuck having a fine mesh face in which the pole pieces are of the same width throughout their holding faces and are capable of exerting a high holding force for small pieces.

Another object of the invention is to provide a magnetic chuck having practically no dead spots even for quite small pieces of material.

A further object of the invention is to provide a chuck of economical and compact construction and capable of holding a large number of pieces to be worked on.

An important object of the invention is to provide a magnetic chuck having an auxiliary detachable face plate adapted to be loaded with articles while removed from the chuck and capable of being firmly held in place on the chuck magnetically and to firmly hold the articles to be operated upon.

Another and further object of the invention is to provide a chuck having a detachable face plate which is firmly held in place and functions efficiently even though inaccurately positioned on the chuck.

An important object of the invention is to provide a rotary magnetic chuck embodying a non-magnetic ring which acts both as a bearing for the chuck and as a non-magnetic separator to prevent magnetic flux from passing from the chuck to the frame of a machine on which it is mounted.

Heretofore in the art, magnetic chucks have been constructed with the holding faces of the pole pieces of different sizes according to the sizes of the pieces to be held. However, the commercial field for magnetic chucks has been limited to classes of work in which the pieces to be held have been of relatively large size due to the difficulties which have been encountered when it has been attempted to build a "fine mesh" chuck, viz, one in which the operative face of the chuck is finely divided into sections of opposite polarity.

In order to obtain a satisfactory chuck having a relatively large operative face, it is necessary to employ a plurality of energizing coils and cores which are operative upon the face plate of the chuck at separated points. In the prior art it has been customary to wind the coils for adjacent cores in opposite directions so that adjacent cores are of opposite magnetic polarity and lines of magnetic flux are induced which pass about a magnetic circuit comprising a plurality of cores. In conjunction with cores thus energized, face plates have been provided having poles which receive flux from a core or cores of positive polarity and transmit it in the direction of cores of negative polarity. From these face plate poles, the flux passes to similar face plate poles which conduct the flux along their lengths to cores of negative polarity. The only portion of the flux which is effective to hold work in position is that which is delivered to the very face of the chuck and passes through the work after leaving one set of face plate pole pieces and before entering the other set. With these prior art constructions in which the flux is conducted more or less longitudinally along the face plate pole pieces of each set, the flux which is delivered to the very face of the chuck and is available for holding articles in position, is relatively limited and the flux density varies greatly throughout the face of the chuck. This results in small holding power and objectionable dead spots. Also in other forms of prior art chucks, the magnetic path is such that an attempt to subdivide the face to a fine mesh results in a greatly diminished and irregular distribution of the flux which is effective in holding pieces to be operated upon.

Another disadvantage of these prior art chucks in which the flux passes from one core to another is that the length of the flux path is relatively long, thus requiring a large magneto-motive force with a correspondingly large consumption of power in order to develop a flux sufficient for many operating conditions.

The present invention disclosed in the form of a rotary magnetic chuck overcomes the difficulties of the known prior art by a construction in which there is a disc shaped base portion of magnetic material having a plurality of circularly disposed upstanding cores. These cores are surrounded collectively by a circular wall upstanding from the base portion at its periphery, and are separated from each other by radially extending partition walls which project upwardly from the base portion and extend from the center of the base portion to the circular wall at the periphery thereof.

The chuck is provided with a face plate comprising a ring of magnetic material which registers with the circular wall and which surrounds a hub of magnetic material that registers with a corresponding center portion formed at the intersection of the radially extending partition walls. Spokes of magnetic material connect the ring with the hub and register with the partition walls which divide the chuck into a plurality of compartments. Extending between adjacent spokes are concentric circumferential portions forming a grid between each pair of adjacent spokes. The construction of the face plate thus far described constitutes what may be termed one of the pole members of the face plate.

Positioned between each pair of adjacent spokes is a flat sector-shaped pole member, which passes beneath the grid of circumferentially extending portions and registers with one of the cores of the chuck. These flat pole members are provided with a series of upstanding poles, each in the form of a sector of a ring which projects in a space between, but is magnetically insulated from, a pair of circumferentially extending portions connecting adjacent spokes of the wheel-like pole member of the face plate.

Each of the cores is provided with an energizing coil and all coils are so wound that the magnetic flux in each of the cores is in the same direction. By means of this construction, the flux passes from each core into the corresponding sector-shaped face plate pole member, from which it is delivered to the face of the chuck by the upstanding poles. From this point the flux passes by way of work-pieces being held on the chuck to the wheel-like pole member comprising the spokes and circumferentially extending portions, and is returned to the bottom of the cores by way of the upstanding circular wall and the partition walls which divide the chuck into compartments.

By means of this construction a chuck is obtained which has a large and very fine mesh face, at all points of which there is a relatively high density flux available for holding pieces to be worked on. This particularly adapts the chuck for holding small pieces for multiple surface grinding and the like.

Each core being in effect, surounded by a shell through which the flux is returned to the base of the core, a construction is provided in which the length of the magnetic path is reduced to a minimum, and hence a minimum magneto-motive force is required to set up a given amount of flux. This effects a corresponding economy in the power consumed by the energizing coils.

It is realized that the present invention may be embodied in structures other than those disclosed herewith and hence it is desired the present disclosure be considered as illustrative and not in the limiting sense.

Figure 1 of the drawings is a perspective view showing a rotary magnetic chuck embodying the present invention, with the face plate removed.

Figure 3 is a fragmentary sectional view showing the mounting of the slip rings and connection to the energizing coils.

Figure 4 is a plan view of one element of the face plate prior to assembly.

Figure 5 is a sectional view taken on the line 5—5 of Figure 4.

Figure 6 is a plan view of one of the sector shaped pole members of the face plate prior to assembly.

Figure 7 is a section of the same taken on the line 7—7 of Figure 6.

Figure 8 is a plan view of the chuck showing the face plate after assembly.

Figure 9 is a fragmentary sectional view taken on the line 9—9 of Figure 8.

Figure 10 is a plan view of the auxiliary face plate.

Figure 11 is a sectional view of the same taken on the line 11—11 of Figure 10.

Figure 1:
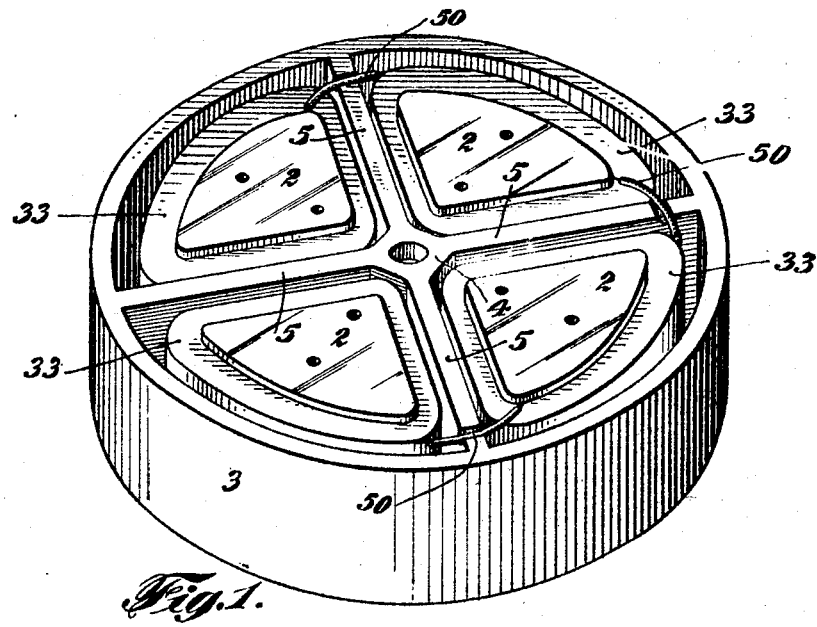
Figure 2:
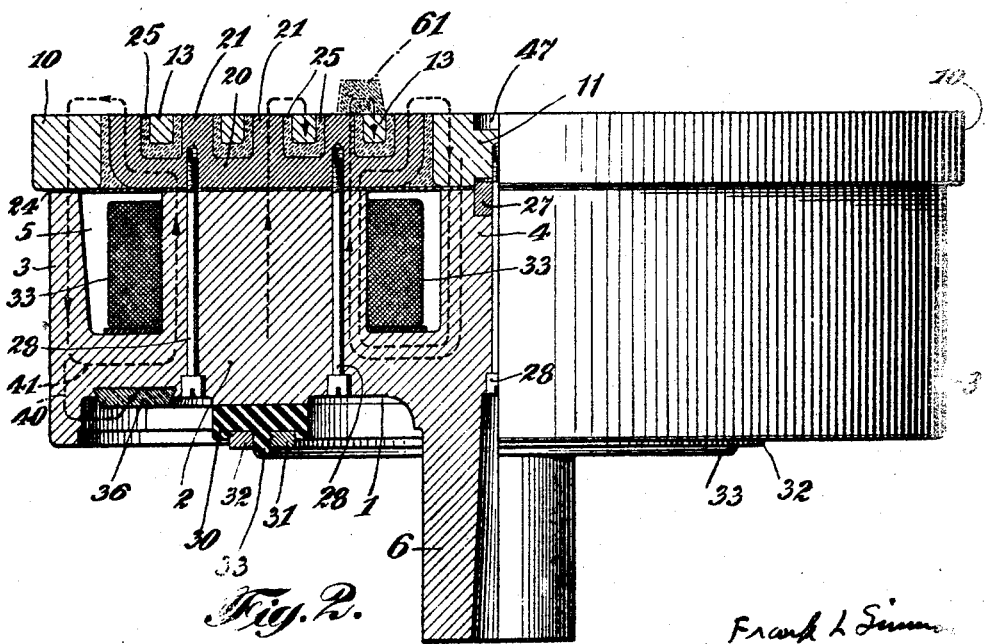
Figure 2 is a sectional view partially in elevation taken on the line 2—2 of Figure 8.

Referring to Figures 1 and 2, the chuck disclosed comprises a disc-shaped base portion 1, from which project a plurality of circularly disposed cores 2, which are collectively enclosed by a circular wall 3 upstanding from the periphery of the base portion 1. Upstanding from the center of the disc-shaped base portion 1 is a center portion 4 from which partition walls 5 extend radially to the circular wall 3, thereby dividing the chuck into four compartments, one for each of the core pieces 2. Projecting from the center of the back side of the base portion 1 is a mounting member 6 by means of which the chuck is adapted to be mounted upon a spindle to be rotated.

Referring to Figures 4 and 5, one element which enters into the construction of the face plate of the chuck comprises a ring 10 of magnetic material which surrounds a hub 11 positioned centrally with respect to the ring and magnetically connected thereto by spokes 12. Extending between each adjacent pairs of spokes are a plurality of concentric circumferentially extending portions 13 which are spaced apart forming a grid. As shown in Figures 5 and 9, the portions 13 are, throughout most of their length, thinner than the ring 10 and hub 11.

Referring to Figures 6 and 7, which show one of four sector shaped pole members that enter into the construction of the face plate, a flat sector shaped piece of magnetic material 20 is provided with a plurality of upstanding poles 21, each of which is in the form of a sector of a ring. The face plate is assembled by positioning the flat portion 20 of the sector shaped pole members beneath the grid formed by circumferentially extending portions 13, with the poles 21 fitting in the spaces between portions 13 of the wheel-like pole members. These sector shaped pole members are separated from the wheel-like pole member by non-magnetic material such as Babbitt metal 25 shown in Figure 2. When the face plate has been assembled, the relation between the circumferentially extending portions 13 of the wheel-like pole member and flat portions 20 of the sector shaped pole members is as shown in cross-section in Figure 9.

The face plate thus assembled is positioned on the chuck body with the ring 10 registering with the upper edge of the wall 3, the spokes 12 registering with the upper edge of the partition walls 5, the hub 11 registering with the center portion 4, and the sector-shaped pole members registering with the upper ends of the cores 2. A dowel 27 aids in centering the face plate with respect to the body of the chuck; and the face plate is held in position by cap screws 28 which pass through the cores 2, the center portion 4, and the wall 3 and are threaded into the magnetic parts of the face plate.

A gasket 24 in the form of a complete disc, except for holes for the passage of cap screws 28 and dowel 27, provides a water-tight seal at the upper edge of circular wall 3 and partition walls 5. A water-tight fit is made where insulating wires 50 traverse the partition walls 5, and hence the chuck as a whole is water-tight, and the various compartments are water-tight with respect to each other. This construction adapts the chuck for wet grinding operations; and should a leak occur only one coil will be damaged as the fluid will be confined to a single compartment.

Affixed to the underside of the base portion 1 in any suitable manner is a ring-shaped base 30 of insulating material, such as a phenol condensation product, having molded into it slip rings 31 and 32. Projecting from the plane of the operative faces of the slip rings 31 and 32 is an insulating bead or ridge 33, integral with the base 30, which forms a barrier between the rings 31 and 32, thereby preventing accidental short-circuiting of the rings, which might otherwise be occasioned as by accumulation of foreign matter. Electrical connection from the slip rings 31 to 32 to the energizing coils 33 positioned within the chuck may be in any suitable manner as by such means as a stud 34 (Fig. 3) threaded into the slip rings and passing through a bushing 35 in the base portion 1 of the chuck body.

A ring 36 of bearing material cast in a suitable retaining groove on the underneath side of the base portion 1 provides a suitable bearing for rotation of the chuck in service. This ring cooperates with a complementary bearing ring (not shown) carried by the machine on which the chuck is mounted.

Ring 36 is made of non-magnetic material and in addition to acting as a bearing ring, it acts as a non-magnetic separator to prevent magnetic flux from passing between the chuck and the body of the machine with which it is used.

Referring to the dotted lines in Figure 2, it is seen that the flux which passes to the ring 10 of the face plate is returned to the bottoms of the cores 2 by way of the wall 3 and the portion of the base 1 which is intermediate the wall 3 and the cores 2. In the absence of non-magnetic ring 36, the reluctance of a path represented by the dot-dash line 40 through part of the machine on which the chuck is mounted would be as low or lower than the reluctance of the path represented by the dotted line 41 and hence a large part of the flux returning from ring 10 to the base of the cores 2 would be operative to lock the chuck to the grinder or machine on which it is mounted, thus interfering with its rotation. However, the positioning of the non-magnetic ring 36 intermediate the wall 3 and the cores 2 serve to tremendously increase the reluctance of the path 40, and hence to magnetically insulate the chuck from the grinder or machine by confining the flux to the path 41.

Referring to the dotted lines in Figure 2 showing the flux paths, it is seen that the flux is conducted practically perpendicularly to the very face of the chuck by the poles 21, from which it passes through pieces such as 61 which are being held by the chuck, then to portions of the wheel-like face plate pole members and is returned to the core by a path of minimum length. The path of the flux to the very face of the chuck through the poles 21 is in nearly all cases in the direction of the field set up by the energizing coils 33 and hence a very high density flux is delivered to the very face of the chuck and is operative to hold pieces such as 61. The shortness of the total flux path reduces the magnetomotive force required to a minimum and hence economizes in the amount of power which the chuck consumes.

The return path of that portion of the flux which emerges from the fact of the chuck near its periphery is of especially low reluctance due to the large cross-section of the ring 10 and the circular wall 3. This causes the establishment of an especially high holding force at the periphery of the chuck, which is very advantageous in multiple surface grinding of small parts for the reason that when the chuck is loaded with parts, those at the periphery are held in place by an unusually strong force and hence aid in retaining the parts near the center against centrifugal or grinding forces.

It is seen that the construction is such that the face plate may be subdivided to a very fine mesh without materially diminishing the density of the flux delivered to the very face of the chuck and hence that the construction provided is particularly adapted to the holding of very small parts. Furthermore, it is seen that the construction is characterized by very short magnetic paths, thus economizing in the power required to produce a given holding force.

In the grinding of very small parts, considerable time is consumed in removing the ground parts from the face of the chuck and reloading it with fresh parts, and hence it is desirable to avoid idleness of the chuck while this is being done. To this end, applicant provides a plurality of auxiliary face plates, one of which is shown in Figures 10 and 11. One of these auxiliary face plates is loaded with fresh parts during a preceding grinding operation and when the grinding is terminated, it is interchanged with the face plate carrying the parts just ground, and operation of the chuck is immediately resumed.

These auxiliary face plates are similar in general construction to the main face plate of the chuck, and comprise a ring 40 which surrounds a hub 41 magnetically connected to the ring by spokes 42. Extending between adjacent spokes 42 are circumferentially extending portions 43, forming a grid. The portion thus far described is a single element magnetically and corresponds to the wheel-like pole member of the main face plate. Positioned in the spaces of the grid formed by the circumferentially extending portions 43 are pieces 44 in the form of a sector of a ring separated magnetically from the remainder of the face plate by non-magnetic material 45, such as Babbitt metal or the like. These sector-of-a-ring-shaped pieces 44 correspond to the sector-of-a-ring-shaped poles 21 of the main face plate. After one of these auxiliary face plates have been loaded with small parts, it is positioned on the chuck where it is held in position magnetically, the pieces to be operated upon being firmly held in position by magnetic flux which passes from the polar members of the face plate through the members of the auxiliary face plate, and then through the pieces which are being held.

A dowel 46 positioned in the center of the auxiliary face plate is adapted to cooperate with a depression 47 in the center of the main face plate, thus aiding in centering the auxiliary face plate. This dowel is preferably removable from the auxiliary face plate so that the underside of the face plate may be reground or refinished without difficulty. No dowels are provided for angular positioning of the auxiliary face plates for the reason that the chuck is of such fine mesh that there are practically no dead spots, and hence accurate angular positioning of the auxiliary face plates is not necessary.

Figure 12:
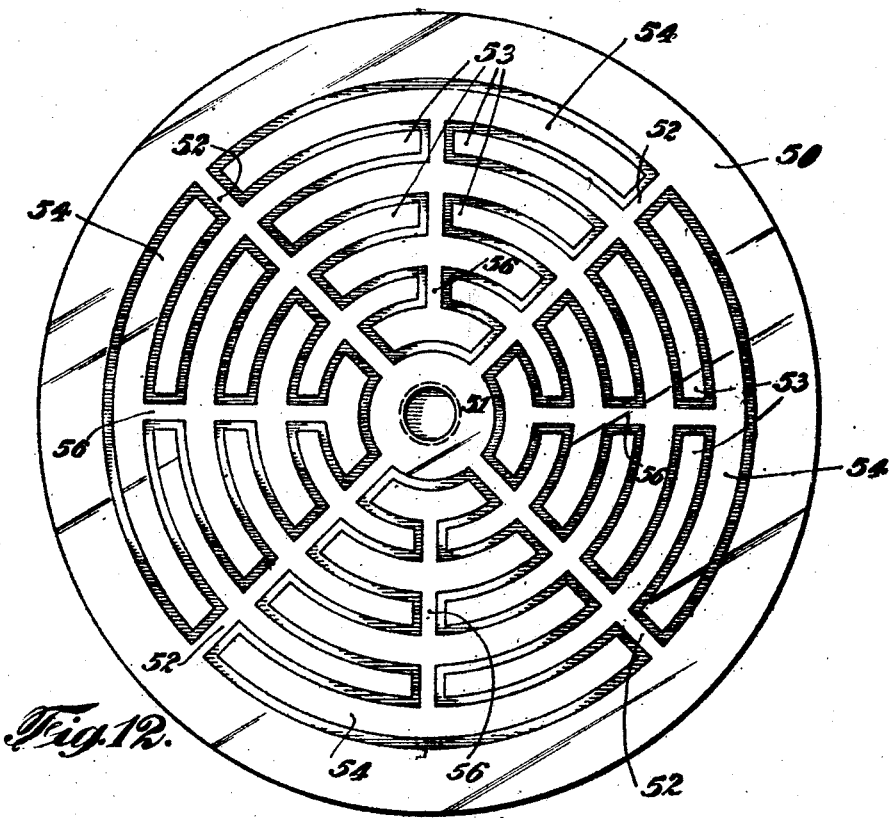
Figure 12 is a plan view of an alternative form of face plate.
Figures 13, 14:
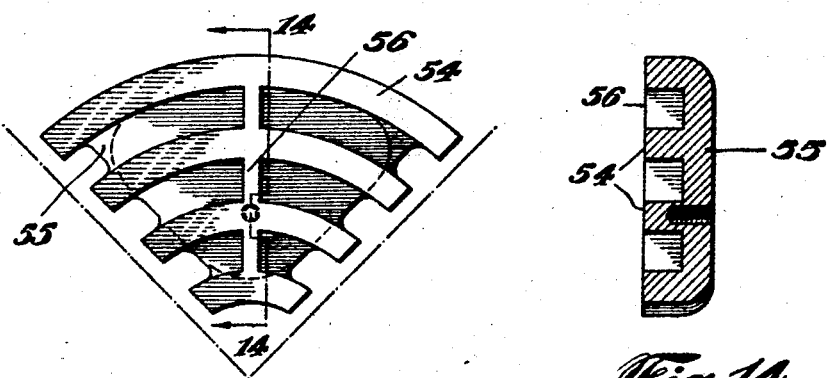
Figure 13 is a plan view of one of the sector shaped pole members of the face plate shown in Figure 12, prior to assembly.
Figure 14 is a sectional view taken on the line 14—14 of Figure 13.

Figures 12, 13 and 14 show the assembly and one of the parts for an alternative form of face plate for a chuck embodying the present invention. In this form, the face plate comprises a pole member consisting of a ring 50 surrounding a hub 51 and magnetically connected thereto by spokes 52. Projecting from each side of the spokes 52 are circumferentially extending portions 53. Sector-shaped pole members, such as shown in Figure 13, are provided with circumferentially extending pole pieces 54 which project upwardly from flat sector-shaped portion 55 and are each in the form of a sector of the ring. The center of adjacent poles 54 are connected magnetically by portions 56 upstanding from the flat portion 55. The face plate is assembled as shown in Figure 12, with the portion 56 positioned between the spaced ends of circumferentially extending portions 53, the sector shaped pole members being magnetically separated from the wheel-like pole member by suitable non-magnetic material.

Applicant's copending application, Serial Number 392,951, filed June 30, 1920, discloses a magnetic chuck in which there is a face plate having a wheel-like pole member. The structure of a wheel-like pole member having a plurality of concentric circumferentially extending portions of magnetic material connected with the spokes of the wheel-like structure is claimed broadly in that application.

Having thus described my invention, what I claim is:

1. As an article of manufacture, a face plate for a magnetic chuck, comprising a ring of magnetic material, a plurality of spokes of magnetic material magnetically connected to said ring, a plurality of concentric circumferentially extending magnetic portions magnetically connected to said spokes, and a plurality of sector-shaped pole members having upstanding poles interfitting with said circumferentially extending portions, each of said pole members having on its under side a flat sector shaped surface adapted to register with a sector shaped core.

2. As an article of manufacture; a face plate for a magnetic chuck; comprising a ring of magnetic material; a hub of magnetic material, a plurality of spokes magnetically connecting said ring and said hub; a plurality of concentric circumferentially extending portions of magnetic material magnetically connected with said spokes; and a plurality of pole members having upstanding poles interfitting with said circumferentially extending portions, each of said pole members having on its under side a flat sector shaped surface adapted to register with a sector shaped core.

3. As an article of manufacture; a pole member for a magnetic chuck face plate comprising a ring of magnetic material; a hub of magnetic material positioned concentrically with respect to said ring, said ring being throughout of the same thickness as said hub, a plurality of spokes magnetically connecting said hub with said ring; and a plurality of concentric circumferentially extending portions magnetically connecting adjacent spokes.

4. As an article of manufacture; a pole member for the face plate of a magnetic chuck comprising a ring of magnetic material; a hub of magnetic material positioned concentrically with respect to said ring; a plurality of spokes of magnetic material connecting said hub with said ring; and a plurality of circumferentially extending portions projecting from said spokes, said hub and said ring being of the same thickness and said projecting portions being at least in part of a lesser thickness and having their center portions integral with said spokes.

5. An article of manufacture; a pole member for the face plate of a magnetic chuck comprising a ring of magnetic material; a hub of magnetic material positioned concentrically with respect to said ring; a plurality of spokes magnetically connected with said hub and said ring, and a grid formed between adjacent spokes by magnetic members extending from one spoke to another, said ring being throughout of substantially the same thickness as said hub and the mid-portions of the members of said grid being of a lesser thickness than said hub.

6. A magnetic chuck comprising a plurality of circularly disosed cores, each of said cores having an end located in a common plane; an energizing coil embracing each core; magnetic material formed to surround each coil individually with a sector-shaped shell, said shells having edges terminating in the plane of said core ends; and a face plate comprising a pole member registering with the said edges of each of said sector-shaped shells and a plurality of additional pole members, one of which registers with each of said cores.

7. A magnetic chuck comprising a circular base portion, an upstanding magnetic portion projecting from the center of said base portion, a plurality of cores circularly disposed with respect to said upstanding magnetic portion, an upstanding magnetic wall surrounding said circularly disposed cores collectively, and a plurality of radially extending partition walls magnetically connecting said upstanding portion with said wall and with said base portion; in combination with a face plate comprising a ring of magnetic material registering with said circular wall, a hub of magnetic material registering with said upstanding portion, and a plurality of spokes magnetically connecting said hub and said ring and registering with said radially extending partition walls.

8. A magnetic chuck comprising a disc shaped base portion, a magnetic portion upstanding from the center of said base portion, a plurality of cores projecting from said base portion and circularly disposed with respect to said upstanding portion, a circular wall projecting from the periphery of said base portion and surrounding said cores, and a wall of magnetic material between adjacent cores and magnetically connecting said upstanding portion and said circular wall; in combination with a face plate comprising a ring of magnetic material registering with said circular wall, a hub of magnetic material registering with said upstanding portion, a plurality of spokes magnetically connecting said hub and said ring and registering with said radially extending walls, a plurality of concentric circumferentially extending portions magnetically connecting adjacent spokes, and a pole member positioned between each pair of adjacent spokes and registering with one of said cores, each pole member comprising upstanding poles interfitting with said circumferentially extending portions.

9. A magnetic chuck comprising a base portion of magnetic material having a front side and a back side, a protective flange depending from the back side of the base portion at its edge and integral therewith, a core of magnetic material projecting from the front side of said base portion, an upstanding magnetic portion projecting from the front side of said base portion and spaced from said core, an energizing coil positioned to set up magnetic flux in one direction in said core and in the opposite direction in said upstanding magnetic portion, and a non-magnetic bearing ring on the back side of said base portion adjacent said protective flange and positioned between said core and said upstanding magnetic portion to prevent magnetic flux from passing between the protective flange and the core by way of the machine on which the chuck may be mounted.

10. A magnetic chuck comprising a base portion of magnetic material having a front side and a back side, a protective flange depending from the back side of the base portion at its edge and integral therewith, a wall of magnetic material projecting from the front side of said base portion at its edge, a core of magnetic material projecting from the front side of said base portion, an energizing coil positioned to set up magnetic flux in one direction in said core and in the opposite direction in said wall, and a non-magnetic bearing ring on the back side of said base portion adjacent said protective flange and positioned between said core and said wall to prevent magnetic flux from passing from said wall to said core by way of parts of a support on which the chuck is mounted.

11. A magnetic chuck comprising a disc shaped base portion of magnetic material having a front side and a back side, a protective flange depending from the back side of the base portion at its edge and integral therewith, a wall of magnetic material projecting from the front side of said base portion at its periphery, a plurality of circularly disposed cores of magnetic material projecting from the front side of said base portion, means to induce magnetic flux in one direction in each core and in the opposite direction in the corresponding portion of said wall, and a bearing ring of non-magnetic material positioned on the back side of said base portion adjacent said protective flange and positioned between said wall and said cores to prevent magnetic flux from passing between the protective flange and the cores by way of the machine on which the chuck may be mounted.

12. As an article of manufacture; a pole member for the face plate of a magnetic chuck comprising a rim of magnetic material; a magnetic portion positioned within said rim, said rim being throughout of substantially the same thickness as said magnetic portion; a plurality of bars magnetically connecting said rim with the magnetic portion positioned within the rim; and a grid formed between adjacent bars by magnetic members extending from one bar to another.

FRANK LEROY SIMMONS.